(12) United States Patent
Hercowitz et al.

(10) Patent No.: US 11,137,241 B2
(45) Date of Patent: Oct. 5, 2021

(54) THREE DIMENSIONAL STRAIN GAGE

(71) Applicant: VISHAY ADVANCED TECHNOLOGIES, LTD., Holon (IL)

(72) Inventors: Amos Hercowitz, Herzliya (IL); Ofir Sudry, Ashdod (IL); Gilad Yaron, Modiin-Macabim-Reut (IL)

(73) Assignee: VISHAY ADVANCED TECHNOLOGIES, LTD., Holon (IL)

( * ) Notice: Subject to any disclaimer, the term of this patent is extended or adjusted under 35 U.S.C. 154(b) by 202 days.

(21) Appl. No.: 16/366,502

(22) Filed: Mar. 27, 2019

(65) Prior Publication Data
US 2020/0309505 A1    Oct. 1, 2020

(51) Int. Cl.
*G01B 7/16*     (2006.01)
(52) U.S. Cl.
CPC ..................... *G01B 7/16* (2013.01)
(58) Field of Classification Search
CPC ..... H01L 23/5387; H01L 24/13; H01L 24/49; G01B 7/16
USPC ......................................................... 73/774
See application file for complete search history.

(56) References Cited

U.S. PATENT DOCUMENTS

| | | | | |
|---|---|---|---|---|
| 5,241,133 A | * | 8/1993 | Mullen, III | ......... H01L 23/3121 |
| | | | | 174/534 |
| 6,232,661 B1 | * | 5/2001 | Amagai | ............. H01L 23/3128 |
| | | | | 257/737 |
| 6,818,469 B2 | * | 11/2004 | Mori | ..................... H05K 1/162 |
| | | | | 257/250 |
| 7,042,087 B2 | * | 5/2006 | Sakamoto | ............... H01L 24/49 |
| | | | | 257/734 |
| 9,547,405 B2 | * | 1/2017 | Oem | ..................... G06F 3/0446 |
| 10,438,895 B1 | * | 10/2019 | Hackler, Sr. | ............ H01L 23/13 |
| 2002/0014673 A1 | * | 2/2002 | Leedy | ................. G03F 7/70658 |
| | | | | 257/419 |
| 2005/0229713 A1 | | 10/2005 | Niblock | |
| 2010/0301473 A1 | * | 12/2010 | Sasaoka | ................ H05K 1/186 |
| | | | | 257/737 |
| 2019/0078953 A1 | | 3/2019 | Huo et al. | |

OTHER PUBLICATIONS

European Search Report dated Jul. 17, 2020, which issued during the prosecution of Applicant's European App No. 19180601.7.

* cited by examiner

*Primary Examiner* — Max H Noori
(74) *Attorney, Agent, or Firm* — Sughrue Mion, PLLC

(57) ABSTRACT

A compact strain gage including a deformable substrate, at least one conductive pattern formed on the deformable substrate, an electrically insulating layer formed over the conductive pattern, at least one electrical connection pad formed over the electrically insulating layer and at least partially overlying the conductive pattern and at least one via extending through the electrically insulating layer and electrically connecting the conductive pattern to the at least one electrical connection pad.

20 Claims, 2 Drawing Sheets

THREE DIMENSIONAL STRAIN GAGE

FIELD OF THE INVENTION

The present invention relates to strain gages generally.

BACKGROUND OF THE INVENTION

Various types of strain gages are known in the art.

SUMMARY OF THE INVENTION

The present invention seeks to provide improved strain gages.

There is thus provided in accordance with a preferred embodiment of the present invention a strain gage including a deformable substrate, at least one conductive pattern formed on the deformable substrate, an electrically insulating layer formed over the conductive pattern, at least one electrical connection pad formed over the electrically insulating layer and at least partially overlying the conductive pattern and at least one via extending through the electrically insulating layer and electrically connecting the conductive pattern to the at least one electrical connection pad.

There is also provided in accordance with another preferred embodiment of the present invention a strain gage including a deformable substrate disposed in a first plane, a conductive pattern formed on the deformable substrate, an electrically insulating layer formed over the conductive pattern, at least one electrical connection pad disposed in a second plane spatially separated from the first plane at least partially in a direction perpendicular to the first plane and at least one via extending through the electrically insulating layer and electrically connecting the conductive pattern to the at least one electrical connection pad.

In accordance with a preferred embodiment of the present invention the strain gage is a compact strain gage.

In accordance with a preferred embodiment of the present invention the at least one conductive pattern is adhered to the deformable substrate by means of an adhesive. Alternatively, the at least one conductive pattern is adhered to the deformable substrate using a casting technique.

Preferably, the deformable substrate and the at least one electrical connection pad lie in mutually parallel planes.

In accordance with a preferred embodiment of the present invention the at least one conductive pattern and the at least one electrical connection pad lie in mutually parallel planes.

In accordance with a preferred embodiment of the present invention the at least one electrical connection pad at least partially overlies the conductive pattern.

There is further provided in accordance with still another preferred embodiment of the present invention a strain gage including a deformable substrate, at least two conductive patterns formed on the deformable substrate, at least one first electrically insulating layer formed over the at least two conductive patterns, at least one electrical interconnection line formed over the at least one first electrically insulating later and electrically interconnecting the at least two conductive patterns, at least one second electrically insulating layer formed over the at least one electrical interconnection line, at least two electrical connection pads formed over the at least one electrically insulating layer and at least partially overlying the conductive patterns, at least one first via extending through the at least one first electrically insulating layer and electrically connecting the at least two conductive patterns to the at least one electrical interconnection line and at least one second via extending through the at least one second electrically insulating layer and electrically connecting the at least one electrical connection line with the at least two electrical connection pads.

In accordance with a preferred embodiment of the present invention the at least two conductive patterns are adhered to the deformable substrate by means of an adhesive. Alternatively, the at least two conductive patterns are adhered to the deformable substrate using a casting technique.

Preferably, the deformable substrate and the at least two electrical connection pads lie in mutually parallel planes.

In accordance with a preferred embodiment of the present invention the at least two conductive patterns and the at least two electrical connection pads lie in mutually parallel planes.

There is even further provided in accordance with yet another preferred embodiment of the present invention a strain gage including a deformable substrate disposed in a first plane, at least two conductive patterns formed on the deformable substrate, at least one first electrically insulating layer formed over the at least two conductive patterns, at least one electrical interconnection line formed over the at least one first electrically insulating later and electrically interconnecting the at least two conductive patterns, at least one second electrically insulating layer formed over the at least one electrical interconnection line, at least two electrical connection pads disposed in a second plane spatially separated from the first plane at least partially in a direction perpendicular to the first plane, at least one first via extending through the at least one first electrically insulating layer and electrically connecting the at least two conductive patterns to the at least one electrical interconnection line and at least one second via extending through the at least one second electrically insulating layer and electrically connecting the at least one electrical connection line with the at least two electrical connection pads.

In accordance with a preferred embodiment of the present invention the at least one first via extends along a third plane between the first and second planes.

In accordance with a preferred embodiment of the present invention the at least one conductive pattern is adhered to the deformable substrate by means of an adhesive. Alternatively, the at least one conductive pattern is adhered to the deformable substrate using a casting technique.

Preferably, the at least two conductive patterns and the at least two electrical connection pads lie in mutually parallel planes.

In accordance with a preferred embodiment of the present invention the at least one electrical connection pad at least partially overlies the conductive pattern.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
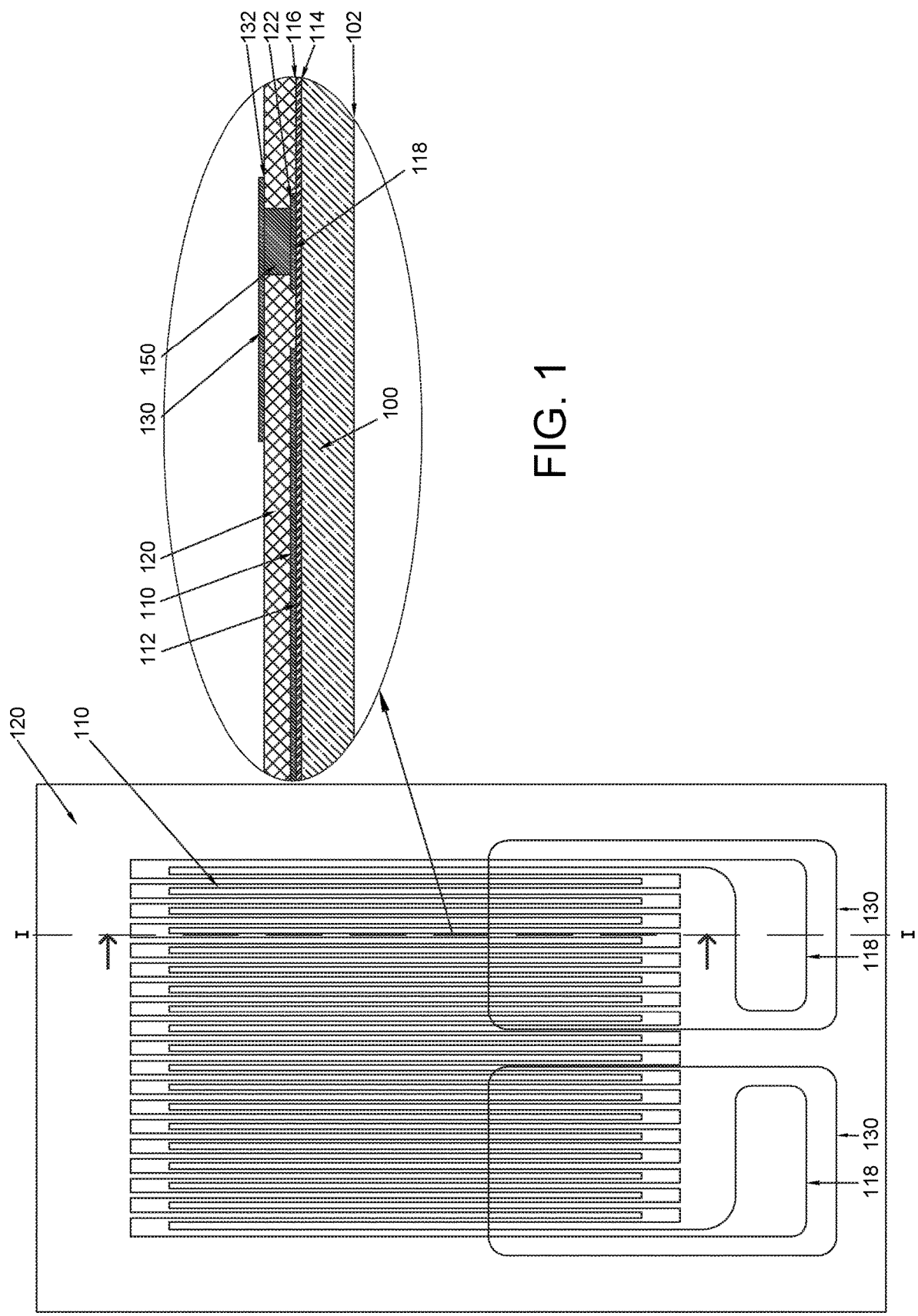
FIG. 1 is a simplified illustration of a strain gage constructed and operative in accordance with a preferred embodiment of the present invention and includes a planar portion and a sectional portion taken along lines I-I.

Reference is now made to FIG. 1, which is a simplified illustration of a strain gage constructed and operative in accordance with a preferred embodiment of the present invention.

As seen in FIG. 1, the strain gage preferably includes a deformable substrate 100, typically formed of a polymer and preferably formed of polyimide, with a thickness of 7-50 microns. Typically, the deformable substrate 100 lies in a first plane 102.

At least one conductive pattern 110 is formed on the deformable substrate 100, typically by at least one of bonding, lithography and chemical techniques. In one embodiment, the conductive pattern 110 is adhered to a polyimide film by means of a thin layer of epoxy 112, preferably with a thickness of approximately 2 microns. Typically, the epoxy layer 112 lies in a second plane 114.

In another embodiment, the polyimide deformable substrate 100 is cast over the conductive pattern 110 without the use of an epoxy adhesive. In the illustration of FIG. 1, only a single conductive pattern 110 is shown, it being appreciated that multiple conductive patterns 110 may be formed on a single deformable substrate 100. Typically, the conductive pattern 110 lies in a third plane 116.

The conductive pattern 110 is preferably formed of a metal alloy, typically constantan, which is a nickel-copper alloy or alternatively from a nickel-chrome alloy or any other suitable metal and preferably has a thickness of between 2.5 and 5 microns. It is patterned, preferably by lithographic techniques, to define a continuous side-by-side array of generally parallel elongate lines, preferably having a pitch of between 10-40 microns. Opposite ends of the array are integrally connected with a pair of internal connection pads 118, which also lie in the third plane 116.

Formed over the conductive pattern 110 is an electrically insulative layer 120, typically formed of epoxy, typically with a thickness of between 10-12 microns. Electrically insulative layer 120 typically lies in a fourth plane 122, parallel to first plane 102, second plane 114 and third plane 116.

A pair of electrical connection pads 130 are formed, typically by sputtering, evaporation plating or immersion plating, or any suitable combination thereof, over the electrically insulating layer 120 and at least partially overlying the conductive pattern 110 and the internal connection pads 118. Electrical connection pads 130 typically lie in a fifth plane 132, parallel to planes 102, 114, 116 and 122.

It is a particular feature of an embodiment of the present invention that each of the pair of electrical connection pads 130 is electrically connected to a corresponding one of the pair of internal connection pads 118 by a via 150, extending through the electrically insulating layer 120. Vias 150 are preferably formed by plating through apertures formed in the electrically insulating layer 120 by lithographic techniques. Vias 150 typically lie in the fourth plane 122.

It is appreciated that the strain gage of FIG. 1 can be bent, stretched, compressed or otherwise configured to be non-planar.

Figure 2:
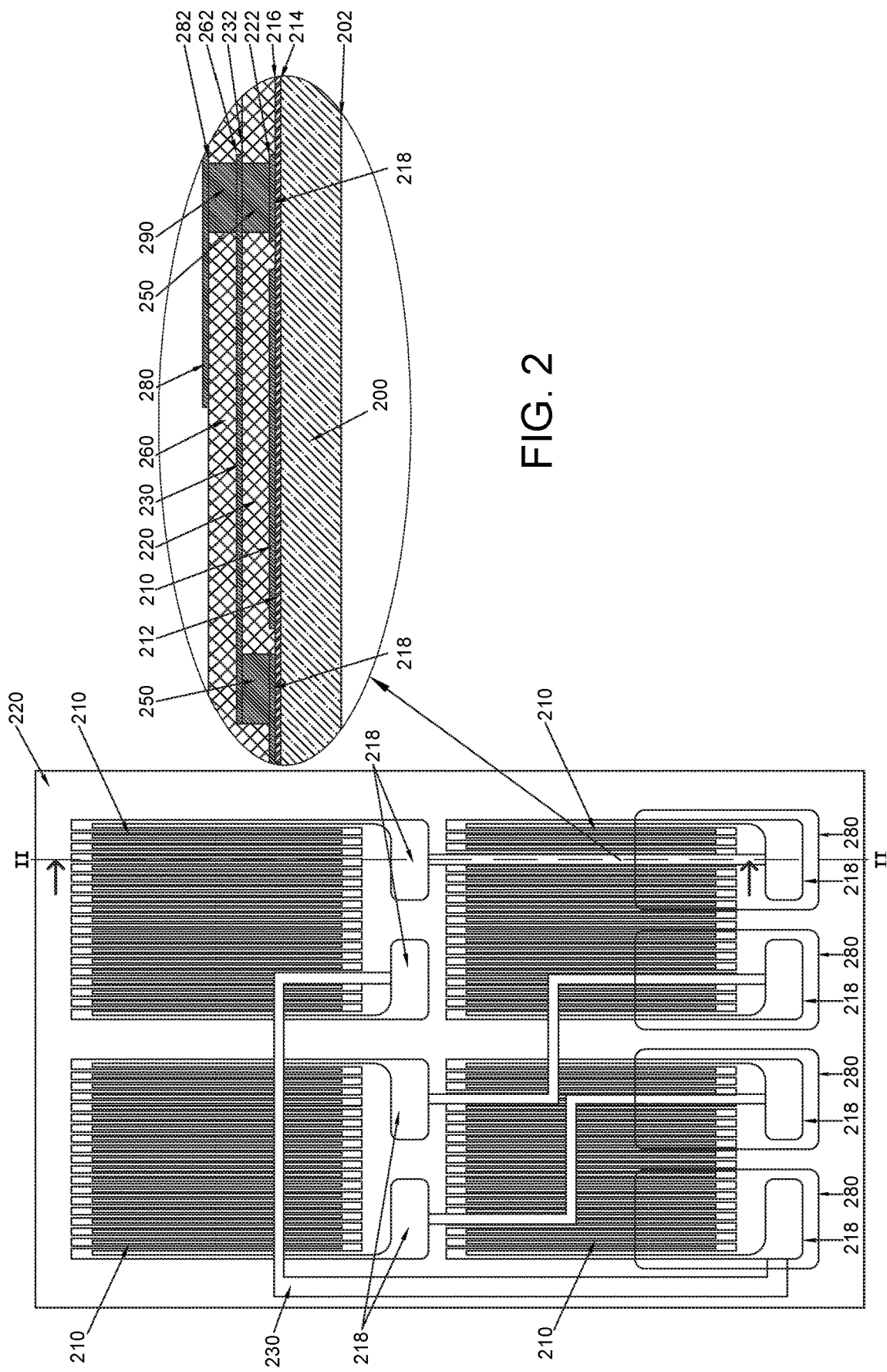
FIG. 2 is a simplified illustration of a strain gage constructed and operative in accordance with another preferred embodiment of the present invention and includes a planar portion and a sectional portion taken along lines II-II.

Reference is now made to FIG. 2, which is a simplified illustration of a strain gage constructed and operative in accordance with another preferred embodiment of the present invention.

As seen in FIG. 2, the strain gage preferably includes a deformable substrate 200, typically formed of a polymer and preferably formed of polyimide, preferably with a thickness of 7-50 microns. Typically, the deformable substrate 200 lies in a first plane 202.

At least one conductive pattern 210 is formed on the deformable substrate 200. In one embodiment, the conductive pattern 210 is adhered to the deformable substrate 200 by means of a thin layer of epoxy 212, preferably with a thickness of approximately 2 microns. Typically, the epoxy layer 212 lies in a second plane 214.

In an alternative embodiment, the polyimide deformable substrate 200 is cast over the conductive pattern 210 without the use of an epoxy adhesive.

In the illustrated embodiment of FIG. 2, four conductive patterns 210 are shown connected in a closed Wheatstone bridge circuit configuration, it being appreciated that multiple conductive patterns 210 may be formed on a single deformable substrate 200 in any suitable electrical circuit configuration. Typically, the conductive patterns 210 lie in a third plane 216, parallel to planes 202 and 214.

Each of the conductive patterns 210 are preferably formed of a metal alloy, typically constantan, which is a nickel-copper alloy, or alternatively from a nickel-chrome alloy or any other suitable metal and preferably has a thickness of between 2.5 and 5 microns. They are each patterned, preferably by lithographic techniques, to define a continuous side-by-side array of generally parallel elongate lines, preferably having a pitch of between 10-40 microns. Opposite ends of each array are each integrally connected with a pair of internal connection pads 218, which also lie in the third plane 216.

Formed over the conductive pattern 210 is a first electrically insulative layer 220, typically formed of epoxy, typically with a thickness of between 10-12 microns. First electrically insulative layer 220 typically lies in a fourth plane 222, parallel to first plane 202, second plane 214 and third plane 216.

A plurality of electrical interconnection lines 230 are formed, typically by sputtering, evaporation plating or immersion plating, over the first electrically insulating layer 220 and at least partially overlying the conductive pattern 210 and the internal connection pads 218. Electrical interconnection lines 230 typically lie in a fifth plane 232, parallel to planes 202, 214, 216 and 222. Electrical interconnection lines 230 interconnect internal connection pads 218 of various conductive patterns 210.

It is a particular feature of an embodiment of the present invention that each of the internal connection pads 218 is electrically connected to a corresponding electrical interconnection line 230 by a via 250, extending through the first electrically insulating layer 220. Vias 250 are preferably formed by plating through apertures formed in the first electrically insulating layer 220 by lithographic techniques. Vias 250 typically lie in the fourth plane 222.

Formed over the electrical interconnection lines 230 is a second electrically insulative layer 260, typically formed of epoxy, typically with a thickness of between 10-12 microns. Second electrically insulative layer 260 typically lies in a sixth plane 262, parallel to planes 202, 214, 216, 222 and 232.

A plurality of electrical connection pads 280 are formed, typically by sputtering, evaporation plating or immersion plating, or any suitable combination thereof, over the second electrically insulating layer 260 and at least partially overlying the conductive pattern 210, the internal connection pads 218 and the electrical interconnection lines 230. Electrical connection pads 280 typically lie in a seventh plane 282, parallel to planes 202, 214, 216, 222, 232 and 262.

It is a particular feature of an embodiment of the present invention that each of the pair of electrical connection pads 280 is electrically connected to a corresponding one of the electrical interconnection lines 230 by a via 290, extending through the second electrically insulating layer 260. Vias 290 are preferably formed by plating through apertures formed in the electrically insulating layer 260 by lithographic techniques. Vias 290 typically lie in the sixth plane 262.

It is appreciated that the strain gage of FIG. 2 can be bent, stretched, compressed or otherwise configured to be non-planar.

It is also appreciated that strain gage of the general type shown in FIG. 2 may be formed with additional electrically insulative layers and additional electrical conductive lines, so as to provide additional functionality, for example to include resistors in the strain gage.

It is additionally appreciated that the interconnections between various conductive patterns may be any suitable interconnections, such as an open Wheatstone bridge, half bridge, quarter bridge or Rosette.

It will be appreciated by persons skilled in the art that the present invention is not limited by what has been particularly shown and described hereinabove. Rather the scope of the present invention includes both combinations and subcombinations of various features described herein as well as modifications thereof which are not in the prior art.

The invention claimed is:

1. A compact strain gage comprising:
   a deformable substrate;
   at least one conductive pattern formed on said deformable substrate;
   an electrically insulating layer formed over said deformable substrate and over said conductive pattern formed thereon;
   at least one electrical connection pad formed over said electrically insulating layer and at least partially overlying said conductive pattern; and
   at least one via extending through said electrically insulating layer and electrically connecting said conductive pattern to said at least one electrical connection pad.

2. A compact strain gage according to claim 1 and wherein said at least one conductive pattern is adhered to said deformable substrate by means of an adhesive.

3. A compact strain gage according to claim 1 and wherein said deformable substrate and said at least one electrical connection pad lie in mutually parallel planes.

4. A compact strain gage according to claim 1 and wherein said at least one conductive pattern and said at least one electrical connection pad lie in mutually parallel planes.

5. A compact strain gage comprising:
   a deformable substrate disposed in a first plane;
   a conductive pattern formed on said deformable substrate;
   an electrically insulating layer formed over said deformable substrate and over said conductive pattern formed thereon;
   at least one electrical connection pad disposed in a second plane spatially separated from said first plane at least partially in a direction perpendicular to said first plane; and
   at least one via extending through said electrically insulating layer and electrically connecting said conductive pattern to said at least one electrical connection pad.

6. A compact strain gage according to claim 5 and wherein said at least one conductive pattern is adhered to said deformable substrate by means of an adhesive.

7. A compact strain gage according to claim 1 and wherein said at least one conductive pattern and said at least one electrical connection pad lie in mutually parallel planes.

8. A compact strain gage according to claim 5 and wherein said at least one electrical connection pad at least partially overlies said conductive pattern.

9. A strain gage comprising:
   a deformable substrate;
   at least two conductive patterns formed on said deformable substrate;
   at least one first electrically insulating layer formed over said at least two conductive patterns;
   at least one electrical interconnection line formed over said at least one first electrically insulating later and electrically interconnecting said at least two conductive patterns;
   at least one second electrically insulating layer formed over said at least one electrical interconnection line;
   at least two electrical connection pads formed over said at least one electrically insulating layer and at least partially overlying said conductive patterns;
   at least one first via extending through said at least one first electrically insulating layer and electrically connecting said at least two conductive patterns to said at least one electrical interconnection line; and
   at least one second via extending through said at least one second electrically insulating layer and electrically connecting said at least one electrical connection line with said at least two electrical connection pads.

10. A strain gage according to claim 9 and wherein said at least two conductive patterns are adhered to said deformable substrate by means of an adhesive.

11. A strain gage according to claim 9 and wherein said deformable substrate and said at least two electrical connection pads lie in mutually parallel planes.

12. A strain gage according to claim 9 and wherein said at least two conductive patterns and said at least two electrical connection pads lie in mutually parallel planes.

13. A strain gage comprising:
   a deformable substrate disposed in a first plane;
   at least two conductive patterns formed on said deformable substrate;
   at least one first electrically insulating layer formed over said at least two conductive patterns;
   at least one electrical interconnection line formed over said at least one first electrically insulating later and electrically interconnecting said at least two conductive patterns;
   at least one second electrically insulating layer formed over said at least one electrical interconnection line;
   at least two electrical connection pads disposed in a second plane spatially separated from said first plane at least partially in a direction perpendicular to said first plane;
   at least one first via extending through said at least one first electrically insulating layer and electrically connecting said at least two conductive patterns to said at least one electrical interconnection line; and
   at least one second via extending through said at least one second electrically insulating layer and electrically connecting said at least one electrical connection line with said at least two electrical connection pads.

14. A strain gage according to claim 13 and wherein said at least one first via extends along a third plane between said first and second planes.

15. A strain gage according to claim 13 and wherein said at least one conductive pattern is adhered to said deformable substrate by means of an adhesive.

16. A strain gage according to claim 14 and wherein said at least one conductive pattern is adhered to said deformable substrate by means of an adhesive.

17. A strain gage according to claim 13 and wherein said at least two conductive patterns and said at least two electrical connection pads lie in mutually parallel planes.

18. A strain gage according to claim 14 and wherein said at least two conductive patterns and said at least two electrical connection pads lie in mutually parallel planes.

19. A strain gage according to claim 13 and wherein said at least one electrical connection pad at least partially overlies said conductive pattern.

20. A strain gage according to claim 14 and wherein said at least one electrical connection pad at least partially overlies said conductive pattern.

\* \* \* \* \*